Dec. 31, 1940.  W. E. SWENSON ET AL  2,226,591
COMBINATION THROTTLE AND CLUTCH CONTROL
Filed Dec. 16, 1939  3 Sheets-Sheet 1

Inventors
William E. Swenson
Hans J. Andersen
Carlsen + Hagle
Attorneys

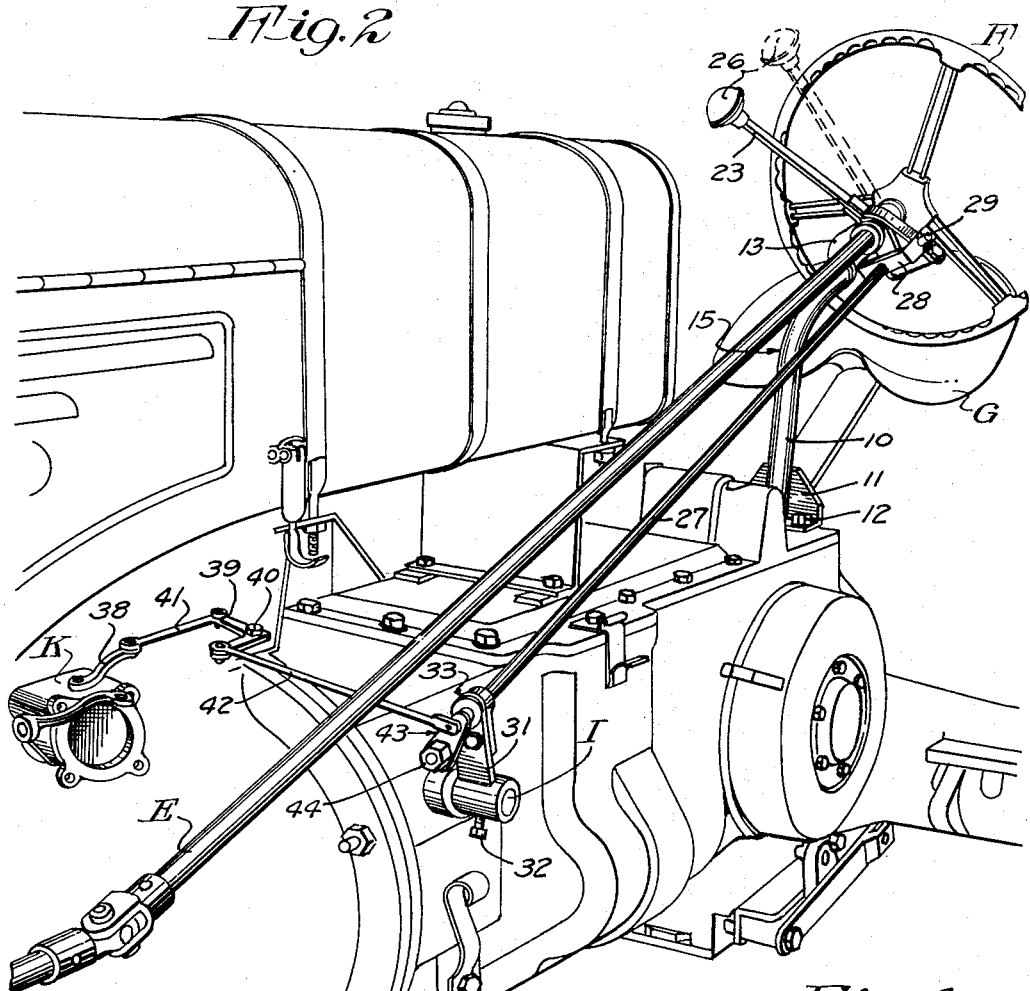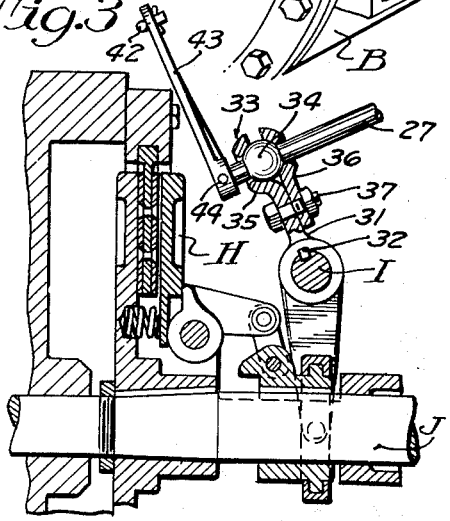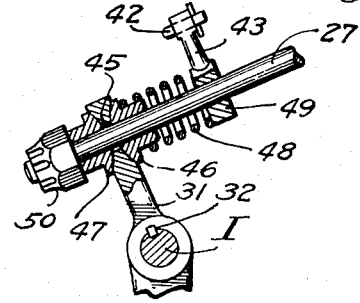

Dec. 31, 1940. W. E. SWENSON ET AL 2,226,591
COMBINATION THROTTLE AND CLUTCH CONTROL
Filed Dec. 16, 1939 3 Sheets-Sheet 3
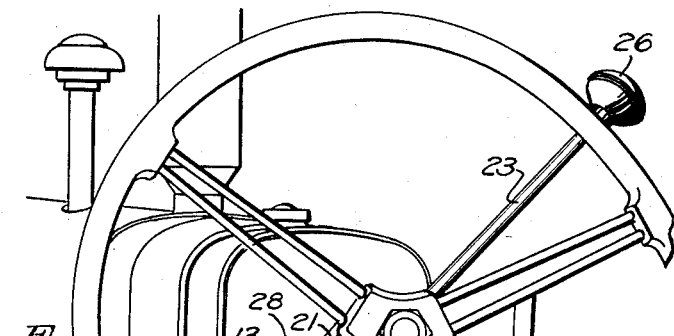
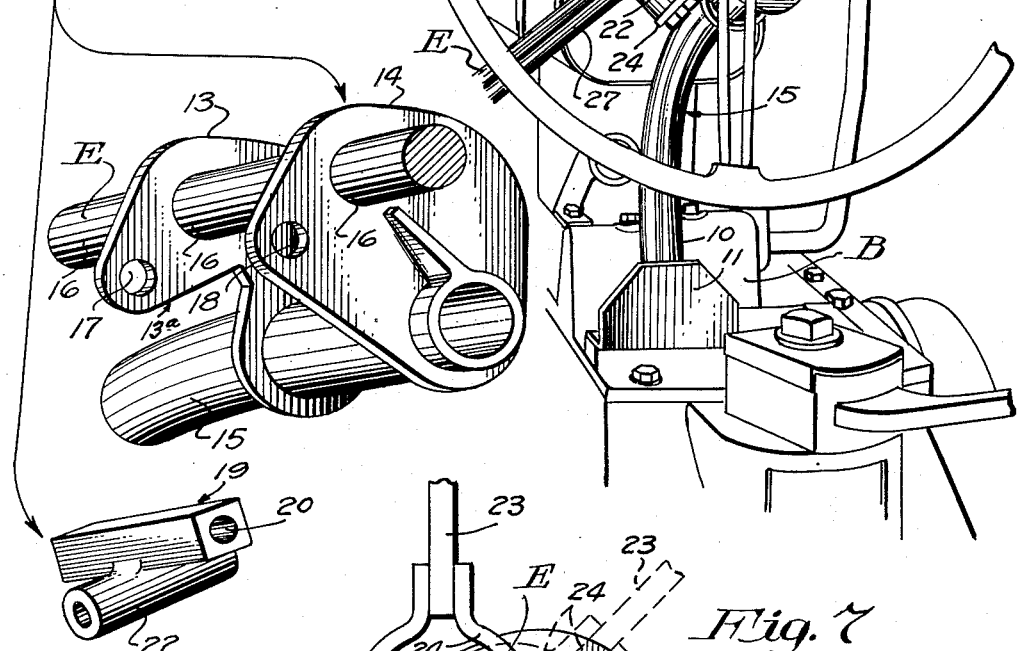
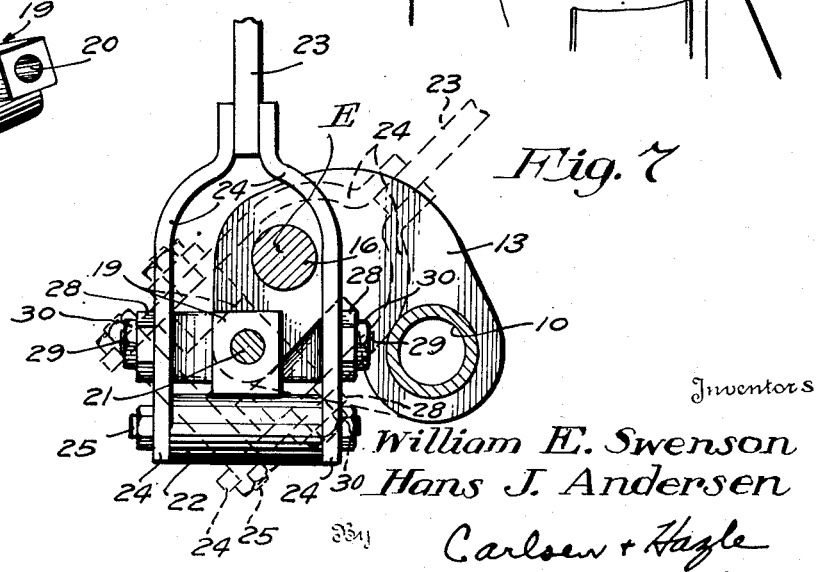
Inventors
William E. Swenson
Hans J. Andersen
Carlsen + Hazle
Attorneys

Patented Dec. 31, 1940

2,226,591

UNITED STATES PATENT OFFICE 2,226,591

COMBINATION THROTTLE AND CLUTCH CONTROL

William E. Swenson, St. Paul, and Hans J. Andersen, Minneapolis, Minn., assignors to Minneapolis-Moline Power Implement Company, Minneapolis, Minn., a corporation of Delaware Application December 16, 1939, Serial No. 309,620

15 Claims. (Cl. 192—.01)

This invention relates to improvements in engine and clutch controls for tractors.

The ordinary tractor includes among its various controls a means for engaging and disengaging the clutch and a throttling means, usually connected with the governor, to control the engine speed. These controls have hitherto been separate items entirely and their manipulation has required separate movements on the part of the operator of the tractor, the throttle control being usually advanced first and then the clutch engaged when starting the tractor, and the operations being in general separately carried out.

The primary object of our invention is, to provide a combination control for the clutch and throttle so that both may be controlled perfectly and in proper synchronism by manipulation of a single lever. Another object is to provide a centralized control of this kind embodying a single control lever located just forwardly of the steering wheel of the tractor in position for convenient manipulation by the hand. A further object is to provide a control mechanism of this kind in which the control lever is arranged to actuate the clutch by movement in one plane and to actuate the throttle by movement in another plane but with complete control of both clutch and throttle in any respective adjustment of the lever. Still a further object is to provide a control mechanism of this kind in which the weight of the lever is caused to assist in its proper operation to relieve the operator of a part, at least of the exertion necessary to control the engine speed.

These and other more detailed and specific objects will be disclosed in the course of the following specification, reference being had to the accompanying drawings, in which—

Fig. 2 is an enlarged perspective view of a rear side portion of the tractor with our control mechanism thereon and with the throttle mechanism or governor shown disconnected from the engine.

Fig. 3 is an enlarged fragmentary longitudinal section through the clutch and the associated operating mechanism therefor.

Fig. 4 is an enlarged fragmentary sectional view of a modified form of connection between the control mechanism and clutch.

Fig. 5 is a rear perspective view of a rear central portion of the tractor showing the centralized control mechanism.

Fig. 6 is an enlarged composite view of the supporting structure and oscillatable lever mounting member used in our control mechanism.

Fig. 7 is an enlarged fragmentary cross section along the line 7—7 in Fig. 1, with the lever shown in an alternate position in dotted lines.

Figure 1:
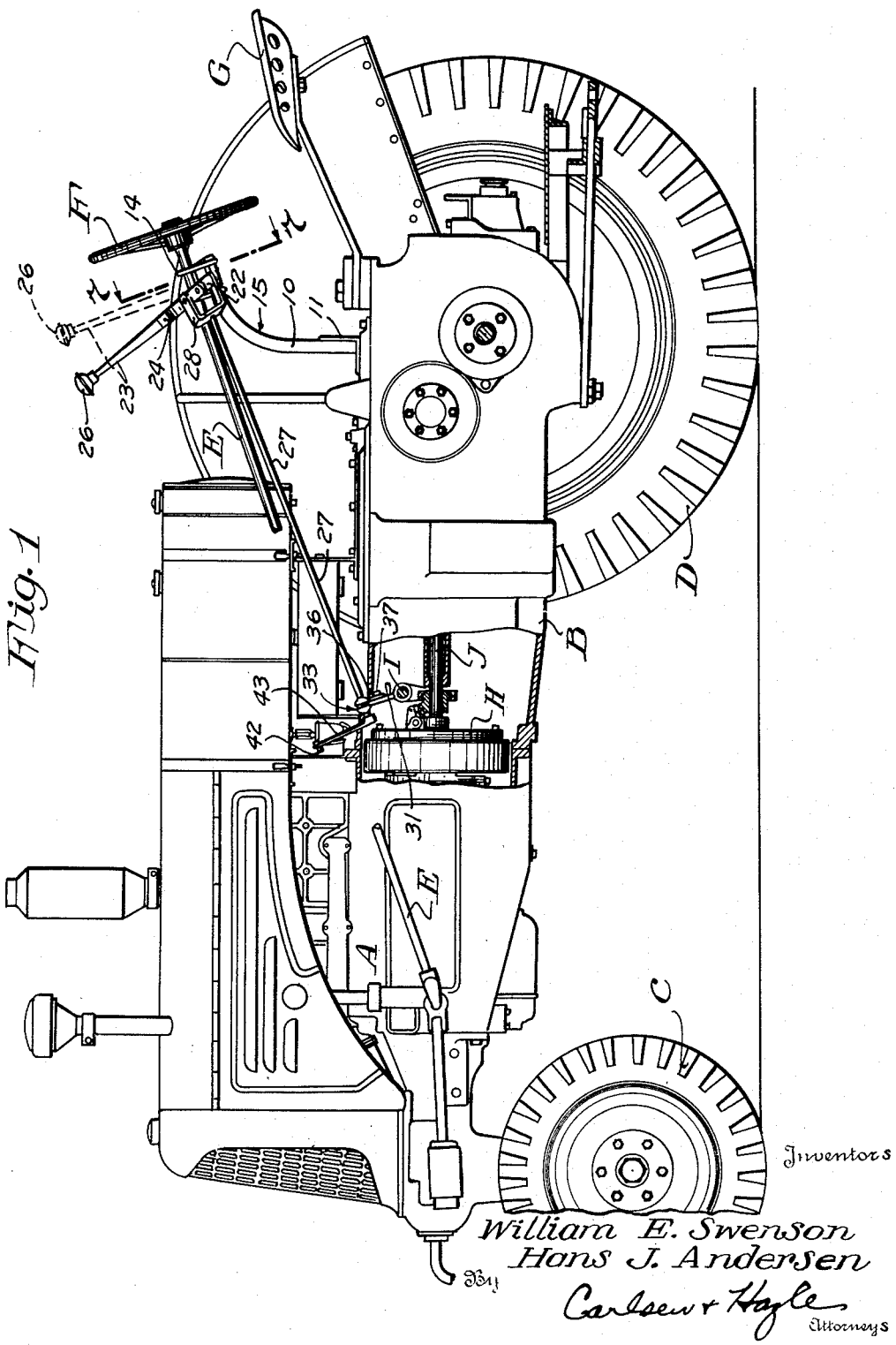
Fig. 1 is a side view of a tractor equipped with our control mechanism, the near rear traction wheel being removed and a portion of the transmission housing being shown in section.

Referring now with more particularity to the drawings, a conventional tractor is shown which includes an engine or power unit A and transmission housing assembly B supported by front wheels C and large rear traction wheels, one of which is shown at D. The front wheels C are angled for steering purposes by a steering shaft E extending rearwardly and provided with a steering wheel F, convenient to the operator's seat G. Within the transmission housing B is located the conventional clutch H which, when operated by a rocking movement of the transverse shaft I, connects the power unit A to the propeller shaft J for the usual purpose. The speed of the power unit or engine, in accordance with conventional practice, is controlled by a governor controlled throttle or throttle valve K which, in the present case, is mounted on the right hand side of the engine opposite to the steering mechanism, and is accordingly shown somewhat diagrammatically in Fig. 2.

Ordinarily the clutch H and throttle K are separately controlled by hand levers (not shown) at the rear of the tractor as has been heretofore set forth.

In accordance with our invention the rear end portion of the steering shaft E is journaled and supported in a supporting post or bracket 10 which is secured by the base flange 11 and bolts 12 to the rear of the tractor and, at its upper end, carries rigidly affixed, spaced mounting plates or supporting members 13 and 14. The post 10 curves rearwardly as shown at 15 to substantially parallel the steering shaft E and the plates 13 and 14 are disposed at right angles thereto with aligned bearing openings 16 to rotatably pass the shaft. This supporting unit is located immediately forward of the steering wheel F as shown.

The plates 13 and 14 have axially aligned openings 17 and 18, the axes of which are arranged substantially parallel with the steering shaft E in a position spaced outwardly and downwardly therefrom. A hand lever carrier or mounting block 19 is provided and the same has an elongated bore 20 through its upper portion, the length of which portion is such that it will just nicely fit between the plates 13 and 14. This block member 19 is oscillatably supported between the plates by a pin or bolt 21 which is passed through the openings 17 and 18 and through the bore 20. Extended at right angles to this upper portion of the block 19 is a lower tubular sleeve 22 forming a rigid part of the block.

The hand lever 23 has a bifurcated lower end the individual forks or prongs 24 of which are spaced apart to receive between their ends the tubular sleeve 22 and to which they are pivotally connected by a bolt 25 passed through the sleeve and through aligned openings in said lower ends. The outer end of the lever 23 carries a knob 26, and it will be evident that, by the foregoing mounting of the lever, it may be swung forwardly or rearwardly in a substantially longitudinal plane toward and away from the steering wheel F or it may be rocked or oscillated from side to side substantially about the axis of the steering wheel. Furthermore, either of these oscillating motions of the lever may be carried out at any point in its movement through the other motion.

An operating shaft or rod 27 is pivotally connected by its forked rear end 28 to the hand lever 23, and this connection, made by studs 29 and nuts 30, between the forked ends of the respective units, is located at a point substantially in alignment with the bolt 21 about which the lever oscillates in the transverse plane. The shaft 27 thus may be oscillated about its axis by rocking the lever sidewise and at the same time, due to the spacing between the studs 29 and bolt 25, the shaft may be reciprocated endwise by moving the lever forwardly or rearwardly. The shaft 27 extends forwardly and downwardly substantially alongside the steering shaft E to a point above and forwardly of the left hand end of the clutch shaft I, where this shaft extends laterally from the transmission housing B. A lever 31 is secured at 32 to the shaft I and at its end is provided with a socket assembly 33 which engages a ball 34 formed on the shaft 27 as best shown in Fig. 3, this structure of course permitting the lever 31 to be oscillated forwardly and rearwardly by similar movement of shaft 27 while not interfering with rotating movement of the shaft about its axis. The socket assembly 33 is formed by a rounded end 35 of the lever itself and a detachable clip 36 held in place by a bolt 37.

The throttle K is controlled by a pivoted arm 38 and connection to this arm, located as it is in this case on the opposite side of the tractor from the control mechanism, is made by a bell crank lever 39 pivoted at 40 on the housing B and connected by link 41 to said arms 38. A cross rod 42 then runs from the other arm of the bell crank 39 to a small lever or finger 43 which is secured rigidly at 44 to the lower end of the shaft 27, all of the aforesaid connection being of course pivotal in nature. The connections are further such that movement of the lever 23 sidewise to the right will actuate the throttle through the various levers and links to increase the engine speed.

The forward plate 13 is cut away on its underside as designated at 13a in Fig. 6, to clear the fork 28 as the lever 23 is moved from side to side.

In lieu of the aforesaid ball and socket connection between the lever 31 and shaft 27, we may employ the assembly shown in Fig. 4. Here the end of the lever 31 is apertured at 45 to loosely pass the shaft 27 and opposite faces of the lever around this opening are faced off angularly to receive corresponding tapered ends of upper and lower collars 46 and 47 mounted on the shaft. The upper collar 46 is urged downwardly by a coil spring 48 braced against the hub 49 by which the lever 43 is mounted (in this case above the lever 31), and the lower collar 47 rests against a nut 50 on the end of the shaft. This connection permits the necessary oscillating movement of both levers 31 and 43 by the shaft 27 and the play required as the lever 31 swings forwardly and rearwardly is provided for by the spring 48.

In the operation of the tractor the driver may control both the clutch and engine speed readily with one hand thus leaving him free to take care of other duties with the other hand. Thus he may gradually accelerate the engine at the same time as he engages the clutch by urging the lever 23 both rearwardly and to the right, and he may at all times maintain full independent control of both functions. In addition to the convenience of smoother starting and better gear shifting control, thus afforded, there is also a distinct safety feature as will be understood.

The forward movement of the hand lever 23 is arranged to disengage the clutch by direct oscillation of the lever 31. Movement of the hand lever to the right, or inwardly, as viewed from the rear, is arranged to accelerate the engine, and the latter movement is desirable since the weight of the lever aids in overcoming the resistance to the spring (not shown) built in the governor which is usually connected to and controls the throttle. For this reason the hand lever, in the idling condition of the engine, is caused to stand upright, as shown in full lines in Fig. 7. Then as it is moved to the right, toward the position shown in dotted lines, the weight of the lever aids in the movement and assists in moving the governor and throttle to higher speed condition.

The location of the hand lever at the steering wheel of course makes it very convenient for the driver of the tractor to control clutch and speed while steering the tractor.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. The combination with a tractor having a clutch and a member controlling the speed of the engine, of a control lever mounted for swinging movement in two planes substantially at right angles to each other, and mechanism connecting said lever to the clutch and speed controlling member for adjusting the same in response to shifting movement of the lever in its respective planes of movement.

2. The combination with a tractor including a steering wheel, clutch and speed control member, of a control lever adjustably supported adjacent the steering wheel for swinging movements in two different planes, and mechanism connecting the lever to the clutch and control member for actuating these parts in response to movements of the lever.

3. The combination with a tractor including a steering wheel, clutch and speed control member, of a control lever adjustably supported adjacent the steering wheel, and mechanism connecting the lever to the clutch and control member for actuating the control member as the lever is moved in a plane substantially parallel to the plane of the steering wheel and for actuating the clutch as the lever is moved toward and away from the said steering wheel.

4. The combination with a tractor including a steering wheel, clutch and throttle, of a control lever adjustably supported immediately forward of the steering wheel, and mechanism connecting the said lever to the clutch and throttle for adjusting the clutch in response to movement of the lever toward and away from the steering wheel in a generally longitudinal direction and for adjusting the throttle in response to movement of the lever in a generally transverse direction in a plane substantially parallel to the plane of the steering wheel.

5. The combination with a tractor including a steering wheel, clutch and engine speed controlling throttle, of a control lever pivotally supported forwardly of the steering wheel for movement about two angularly disposed axes adjacent the axis of rotation of the steering wheel, and mechanism connecting the lever to the clutch and throttle for selectively actuating the same in response to adjustment of the lever about its two pivotal axes.

6. In a tractor including a clutch and engine speed control throttle, a control lever adjustably supported for movement about two angularly disposed axes, an operating member connected to the lever and movable endwise and oscillatable about its axis by adjustment of the lever, and means connecting the said member to the clutch and throttle for adjusting the same respectively by said endwise and oscillating movement of the operating member.

7. A control mechanism for the clutch and throttle of a tractor, comprising a control lever, an operating member connected to said lever, the said lever being adjustably supported for shifting the operating member endwise and for rotating it about its axis, and means connecting the operating member to the clutch and throttle for selectively and cooperatively actuating the same in response to said movements of the operating member.

8. A control mechanism for the clutch and throttle of a tractor, comprising a hand lever, an operating shaft connected to the lever, means supporting the lever adjacent the steering wheel of the tractor for movement in two directions simultaneously and selectively, and means connecting the operating shaft to the clutch and throttle for actuating the same in response to endwise movement and rotary movement imparted to said shaft by movement of the lever.

9. The combination with a tractor including a steering shaft and wheel, a clutch and throttle, of mounting members on the steering shaft immediately forward of the steering wheel, a hand lever adjustably supported by said mounting members for movement in two directions, an operating member connected to the lever and extended forwardly therefrom, a connecting means between the operating member and clutch for actuating the clutch in response to movement of the lever in one direction, and means also connecting the operating member and throttle for actuating the same in response to movement of the lever in the other direction.

10. The combination with a tractor having a steering shaft and wheel, a clutch and a throttle, of a control mechanism for the clutch and throttle comprising spaced rigid mounting members adjacent the steering shaft, a block member pivotally supported by said members, a hand lever pivotally connected to the block member for movement in one direction independently of the block member for movement in another direction together with said block member, an operating rod connected to the lever and shiftable endwise and about its axis thereby, and operating connections between the said rod and the clutch and throttle for selectively actuating the same.

11. The combination with a tractor having a steering shaft and wheel, a clutch and a throttle, of a control mechanism for the clutch and throttle comprising a rigid mounting member supported adjacent the steering shaft forwardly of the steering wheel, a block member pivotally connected to said mounting member, a hand lever pivotally connected to said block member about an axis angularly disposed relative to the pivotal connection between the block and mounting members, a rod pivotally connected to the lever about an axis spaced from the pivotal axis of the lever and substantially aligned with the pivotal axis of the block member, and means connecting the rod to the clutch and throttle for actuating the same in response to movements of the rod and controlled by the said lever.

12. The combination with a tractor having a steering shaft and wheel, a clutch and a throttle controlling engine speed, of a control mechanism for the clutch and throttle comprising a rigid bracket member and spaced mounting members connected thereto for rotatably supporting the steering shaft forwardly of the steering wheel, a block member pivotally mounted between the mounting members for movement about an axis substantially parallel with the steering shaft, a hand lever forked at one end to loosely straddle the steering shaft and block member, the said forked end of the lever being pivotally connected to the block member on an axis disposed at right angles to the pivotal connection thereof and spaced away therefrom, an operating rod pivotally connected to the lever and extended substantially in axial alignment with the pivotal axis of the block member whereby said rod may be shifted endwise and oscillated about its axis by movements of the levers, and operating connections between the rod and the clutch and throttle for controlling the same in response to manipulation of the lever.

13. In a tractor including a steering wheel, a clutch and a throttle, a control means for said clutch and throttle comprising a hand lever adjustably supported adjacent said steering wheel, an operating rod connected to the lever and extended forwardly therefrom, means whereby said rod may be shifted endwise and rotated axially by adjustment of the lever, a clutch lever connected to the clutch and extended adjacent the rod, a ball and socket connection between the clutch lever and rod for moving said lever in response to endwise movement of the rod, and operative connections between the rod and the throttle for adjusting the throttle responsive to rotating movement of the rod.

14. In a tractor including a steering wheel, a clutch and a throttle, a control means for said clutch and throttle comprising a hand lever adjustably supported adjacent said steering wheel, an operating rod connected to the lever and extended forwardly therefrom, means whereby said rod may be shifted endwise and rotated axially by adjustment of the lever, a clutch lever connected to the clutch and extended adjacent the rod, the said clutch lever having an opening loosely passing the rod, spring pressed collars on the rod engaging the clutch lever for adjusting the same in response to endwise movement of the rod, a lever on the rod, an operating lever on the throttle, and connecting means between these levers for actuating the throttle in response to rotation of the rod.

15. The combination with a tractor having a throttle controlled by a governor of the type embodying a spring resisting movement from engine idling to full speed condition, of a hand lever adjustably supported on the tractor, mechanism connecting the lever and governor for actuating the latter in response to movement of the lever, and the said lever being arranged to stand generally upright in the idling condition of the governor and to swing in a downward direction for adjusting the governor to high speed condition, whereby the weight of the lever will aid in overcoming the resistance of the governor spring.

WILLIAM E. SWENSON.
HANS J. ANDERSEN.